United States Patent [19]

Kircher et al.

[11] Patent Number: 4,616,727
[45] Date of Patent: Oct. 14, 1986

[54] HYDRAULIC STEERING FORCE BOOSTER

[75] Inventors: Dieter Kircher, Frankfurt am Main; Hubertus von Gruenberg, Kronberg; Klaus D. Blum, Kelkheim; Peter Becker, Frankfurt am Main, all of Fed. Rep. of Germany

[73] Assignee: Alfred Teves GmbH, Frankfurt am Main, Fed. Rep. of Germany

[21] Appl. No.: 711,856

[22] Filed: Mar. 14, 1985

[30] Foreign Application Priority Data

Mar. 19, 1984 [DE] Fed. Rep. of Germany ....... 3410033

[51] Int. Cl.⁴ .......................... B62D 5/08; B62D 5/10
[52] U.S. Cl. ..................................... 180/142; 60/416; 91/438
[58] Field of Search ............... 180/143, 142, 132, 133; 60/416, 404; 91/438, 464, 28

[56] References Cited

U.S. PATENT DOCUMENTS

| 2,356,492 | 8/1944 | Smith ............... | 180/143 X |
| 2,778,339 | 1/1957 | Mancusi ............ | 91/438 X |
| 3,044,265 | 7/1962 | Schwartz et al. ... | 180/132 X |
| 3,890,996 | 6/1975 | Burckhardt ........ | 60/416 X |

FOREIGN PATENT DOCUMENTS 1435968  5/1976  United Kingdom ............... 180/142

Primary Examiner—John A. Pekar
Attorney, Agent, or Firm—James B. Raden; Donald J. Breh

[57] ABSTRACT

A device for the hydraulic boosting of steering force comprises a cylinder having a working piston which is coupled with a steering rod assembly. The cylinder includes working chambers into which hydraulic pressure can be introduced by way of multi-directional control valves. The steering aid is designed as an accessory unit for a brake system with an auxiliary hydraulic energy supply and will be put into function only during vehicle standstill or at low vehicle speeds.

4 Claims, 3 Drawing Figures

HYDRAULIC STEERING FORCE BOOSTER

BACKGROUND OF THE INVENTION

The present invention relates to a device for the hydraulic boosting of the steering force in an automobile. The device typically comprises a hydraulic cylinder whose working piston is coupled to the steering rod assembly. Pressure fluid is introduced from an auxiliary hydraulic energy source via multi-directional control valves into the working chambers of the device.

In one known steering unit of this type, disclosed in German Patent Publication 30 06 297, multi-directional control valves are electrically controlled through rapid break switches or angular switches when the steering wheel is turned. As a result, hydraulic pressure is supplied into the right or the left working chamber of the hydraulic piston, depending on the angle of steering turn desired, with the pressure boosting the steering actuating force. To conserve the auxiliary energy required, this unit arranges for the associated pump to be started via the electric driving motor only when the steering wheel is actuated. The unit accordingly requires undue component parts and is expensive to manufacture.

In another known servo steering unit described in German Patent Publication 32 22 631, the electric driving motor of the auxiliary energy supply system is connected to the oil pump via an electromagentic clutch. The driving efficiency of the oil pump is permitted to conform to system requirements irrespective of the engine's revolutions or the vehicle speed. Again, such an auxiliary energy supply system is comparatively expensive to manufacture.

It is also known from German Patent Publication 32 22 631 to conform the power consumption of a steering aid unit to the conditions prevailing at very low speed and when the vehicle is at standstill. The steering aid is reduced with increasing speed to augment driving stability.

Accordingly, it is an object of the present invention to provide an improved, effective and reliable steering aid unit.

SUMMARY OF THE INVENTION

It has been found that such an improved steering booster system can be designed as an accessory unit for a brake system equipped with an auxiliary hydraulic energy supply system if the device is activated or operates exclusively during vehicle standstill or at low vehicle speeds.

In one embodiment of the present invention, the booster device is connected to the auxiliary energy supply system of the brake system. It may also utilize a pressure accumulator of its own which can be charged via the supply system of the brake system. In such systems, it is desirable to connect the pressure accumulator in parallel to a pressure accumulator for the brake system. A priority valve can be utilized to insure that an amount of residual energy is maintained that is sufficient for the brake system, or which issues at least an alarm signal if the pressure drops too greatly.

The steering booster device of the present invention is designed for operation during low speed or stationary vehicle operations, such as a steering aid when pulling in or out of a parking space. Therefore, in one embodiment the steering aid unit is deactivated automatically as soon as the vehicle speed has exceeded a predetermined speed threshold value, such as 2 to 5 km/h.

Alternatively, it is likewise possible to combine the activation of the steering aid with the action of engaging the reverse gear or the first or the first and the second gear in a four-speed or five-speed transmission. In some cases, it will be expedient with a like embodiment to have an additional switch deactivate the steering aid unit once a predetermined speed threshold valve has been exceeded.

In one embodiment of the present invention, two working chambers in the hydraulic cylinder communicate via multi-directional control valves with the pressure supply reservoir of the auxiliary energy supply system after deactivation of the steering aid unit. The pumping or displacement of the hydraulic fluid from one to the other chamber of the hydraulic cylinder due to the steering movements transmitted onto the piston results in the damping of the steering which is undesirable in some cases. The work needed for this pumping or transfer becomes less if both working chambers of the hydraulic cylinder are interconnected by a pressure fluid channel. At the inlet of such channel into the chamber, a non-return valve is arranged which is maintained in its opened position by spring force with the pressure balanced, and is closed as soon as an excess pressure is introduced into the working chamber for steering aid. The pressure fluid channel comprising the two non-return valves may be incorporated in the working piston of the hydraulic cylinder.

In another possible arrangement, the hydraulic cylinder or the piston rod of the cylinder piston can be positively or frictionally coupled to the steering rod assembly and then decoupled mechanically, electrically or electrohydraulically from the steering rod assembly to deactivate the steering aid.

In particular, the present invention provides a steering force booster device comprising a hydraulic cylinder, a piston in said cylinder, a steering rod coupled to said piston, said cylinder having working chambers, an auxiliary hydraulic fluid pressure source, and multi-directional control valves via which pressurized hydraulic fluid can be introduced into said working chambers.

DESCRIPTION OF THE PREFERRED EMBODIMENT

Figure 1:
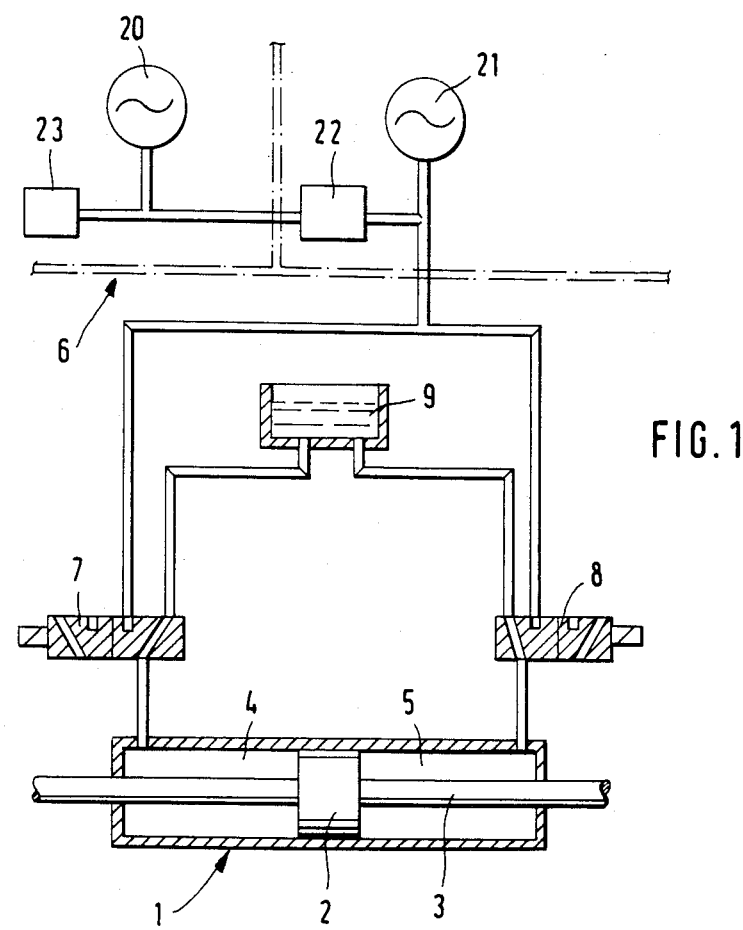
FIG. 1 is a schematic of a power boosting unit in accordance with the present invention.

Referring to FIG. 1 of the drawings, the unit is comprised of hydraulic cylinder 1 having a working piston 2. Piston rod 3 is coupled to a steering rod assembly (not shown) and is projecting from either side of cylinder 1. Hydraulic cylinder 1 has two working chambers 4 and 5 into which pressure can be supplied hydraulically to displace piston 2 in one or the other direction, depending on the steering turn, and to thus transmit a power assisting and boosting steering movement for the steering rod assembly. The magnitude of the force exerted on piston 2 is dependent on the hydraulic pressure sent out of the auxiliary energy supply system 6 via the multi-directional control valves 7,8. In the inactive position of the boosting system, which is as long as the steering turn of the wheels is coincident with the position of the steering wheel, the two working chambers 4,5 of the hydraulic cylinder 1 communicate with a pressure supply reservoir 9 via the multi-directional control valves 7,8 which are three-way/two-position directional control valves. If the steering wheel 10 is turned (see in this respect FIG. 2), valve 7 or 8, depending on the direction of turn, will be excited temporarily by virtue of an angular switch or a rapid break switch, and thus pressure out of energy supply system 6 will be supplied hydraulically into working chambers 4,5 of the hydraulic cylinder 1 until the steering command has been executed. The force exerted on steering wheel 10 is thus boosted hydraulically.

The steering aid unit of the present invention does not possess an auxiliary energy source of its own, but is designed as an accessory unit for a brake system with an hydraulic energy supply and is connectible to the supply system of said brake system. The dot and dash lines in FIG. 1 symbolize this separation. The auxiliary energy supply system as a whole is designated by reference numeral 6. The auxiliary pressure source of the brake system comprises a pressure accumulator 20 to which the steering aid unit is connected. To insure that a pressure sufficient for the brake system is maintained despite the pressure lost by actuation of the steering, in the embodiment of FIG. 1, there is connected in parallel to the pressure accumulator 20 a second pressure accumulator 21 which can be charged likewise through the non-illustrated supply system of the brake system. Priority switch 22 sees to it that, during steering, hydraulic energy is primarily taken from pressure accumulator 21 prior to taking it from accumulator 20.

A pressure alarm switch 23 signals an excessive exhaustion of accumulator 20 that could temporarily impair the function of the brake system. If a brake system with electronic control is involved, a signal from switch 23 prevents a pressure decrease on all or on specific wheels until sufficient operating pressure has been built up again in accumulator 20. By adjustment of the electronic control and by monitoring, it is also possible for the operation of the steering aid unit to discharge accumulator 20 until attainment of a predetermined, relatively low residual pressure. This is possible as the steering aid unit is desired to be operational only at low vehicle speeds and because a comparatively low auxiliary pressure suffices for the supply of the brake system in this operating state of the vehicle. The full capacity of the pressure accumulator 20 of the brake system is required only during panic stops at high speed or when braking with an electronic anti-skid control on very slippery roads, in which situations the steering aid is deactivated or requires but little auxiliary eneryg.

Figure 2:
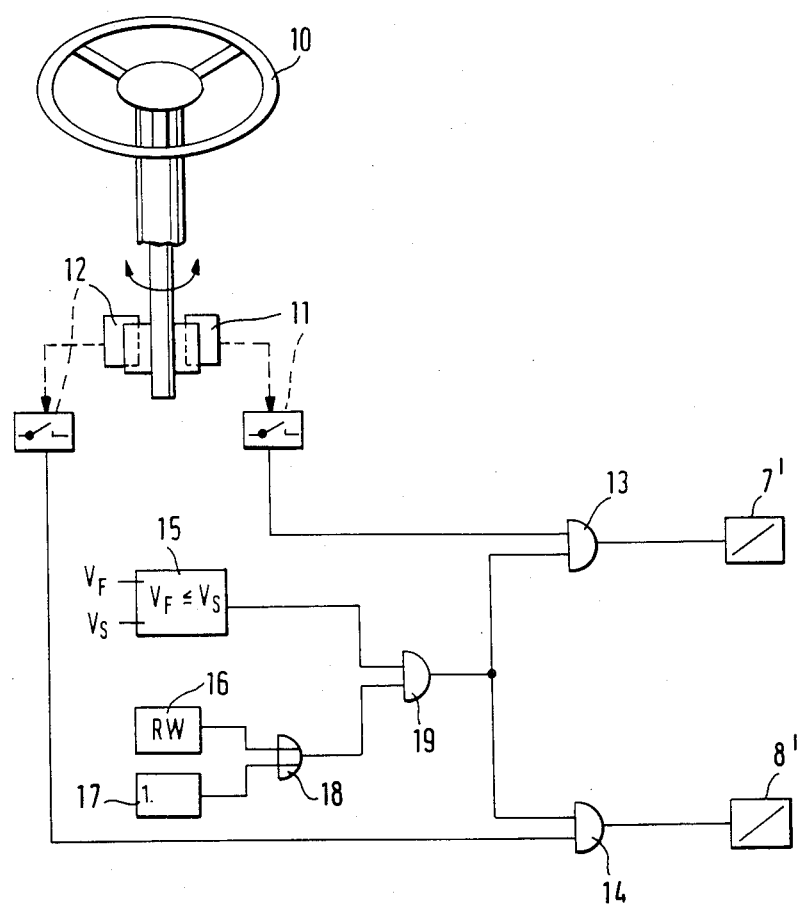
FIG. 2 is schematic of a control circuit and combining circuit for the steering power boosting unit in accordance with the present invention.

Referring now to FIG. 2, either the right or the left, depending on the direction of turn, electric contact 11 or 12 will be closed when turning the steering wheel 10. Dotted lines lead from contacts 11, 12 to the symbolic representation of the switches, and a switch-over command will be applied via AND gates 13 or 14 to exciter coil 7' or 8' of multi-directional control valve 7 or 8. This is provided that also the second AND condition for gate 13 or 14 is fulfilled.

In the embodiment of the invention illustrated in FIG. 2, the vehicle speed $V_F$ will be compared to a predetermined speed threshold value $V_F$ in a comparator 15, and an output signal will be generated only as long as $V_F$ is less than or equal to $V_S$.

Switches 16 and 17 are in a closed position, if either the reverse gear RW or the first forward gear is engaged. For combining, there is an OR gate 18 whose output signal is combined via an AND gate 19. If the reverse gear or the first gear is engaged and the condition monitored by stage 15 is prevailing, the AND condition for gate 19 and, as soon as a steering command is given by turning of the steering wheel 10, for AND gate 13 or 14 is fulfilled. As has been outlined already, this causes delivery of auxiliary energy into one of two chambers 4 or 5, shown in FIG. 1, of the hydraulic cylinder 1 whereby the steering force is boosted.

Figure 3:
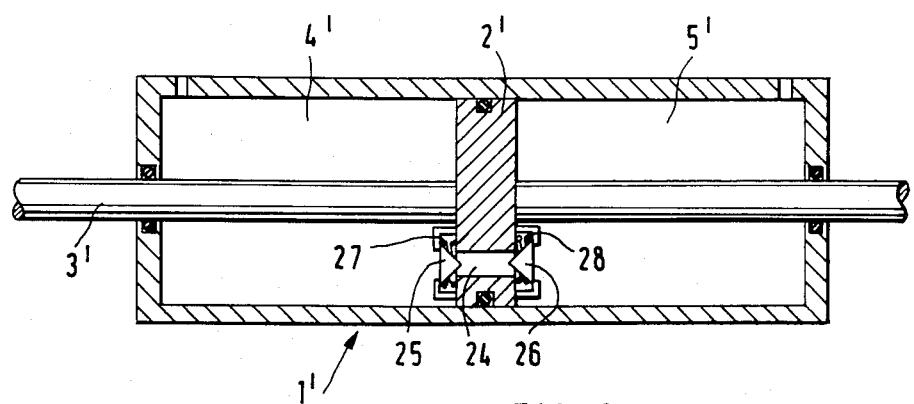
FIG. 3 is an embodiment of a hydraulic cylinder for use in the power boosting unit of the present invention.

FIG. 3 illustrates a hydraulic cylinder 1' having accommodated in its piston 2' a pressure fluid channel 24. At each of the ports of this channel 24 leading into the working chambers 4' and, respectively, 5', there is arranged one non-return valve 25, 26 which is kept by springs 27, 28 in its opened position as long as the pressure is balanced or in the presence of only a low differential of pressure between the working chambers 4', 5'. When the piston 2' moves to and fro caused by steering movements which are transmitted onto the piston 2' via the (non-illustrated) steering rod assembly and the piston rod 3', pressure fluid is displaced through the opened channel 24 from the chamber 4' or 5' into the other chamber so that the steering movement is damped in this phase to a negligibly small extent only by the entrained working piston 2'.

Upon delivery of hydraulic energy into chamber 4' or 5', a differential of pressure will ensue between the chambers 4' and 5' which causes the non-return valve 25 or 26 to close very quickly.

Instead of a like pressure fluid channel 24 together with the pertinent non-return valves 25, 26 or in addition to such means, a positive or frictional engagement may be established between the piston rod 3, 3' and the steering rod assembly. In case the steering aid is deactivated or, respectively, put out of function, for instance due to exceeding of the speed threshold $V_S$ or due to a defect, hydraulic cylinder 1, 1' or piston rod 3, 3' can now be de-coupled mechanically, electrically or electrohydraulically from the steering rod assembly. This avoids any unwanted increase of the steering force on account of parts, in particular the piston, of the steering aid unit being entrained.

What is claimed is:

1. A device for boosting the steering force on a steering arm of a steering system comprising:
   a hydraulic cylinder;
   a piston in said cylinder dividing said cylinder into two working chambers and including a piston rod adapted to be connected to the steering arm of said steering system;
   a pair of electrically operated multidirection, hydraulic, control valves each having an outlet connected to a respective one of said two working chambers and an inlet;
   two hydraulic pressure accumulators each accumulator connected to an external hydraulic fluid pressure source and having outlets connected together and to said control valves in parallel relationship;
   a normally closed pressure responsive priority switch at the outlet of one of said accumulators isolating said one accumulator from the outlet of the other accumulator, said priority switch responsive to open at a predetermined outlet pressure from said second accumulator; and electrical control means for operating said control valves to direct fluid to said working chambers in response to movement of a steering wheel including at least a pair of electrical switches responsive to the position of said steering wheels, each switch electrically coupled to a respective one of said control valves for sending an operating signal to said control valves.

2. The device of claim 1, wherein the external hydraulic fluid pressure source is a vehicle hydraulic brake system.

3. The device of claim 1 including a single pressure fluid channel in said piston interconnecting said two working chambers of the hydraulic cylinder, said channel having inlets opening into the working chambers, and one non-return valve at each inlet kept in an open position by spring force when the pressure across said piston is balanced, and which closes at a specific pressure introduced in the one working chamber in excess of that prevailing in the other working chamber.

4. The device of claim 1, wherein said electrical control means further includes means for comparing an actual vehicle speed to a predetermined threshold value and generating an electrical signal for controlling the operating signal from said switches;

electrical means for generating a signal when a first gear, a second gear, and a reverse gear is engaged; and a gate having inputs coupled to said means for comparing the vehicle speed and the threshold value and to the signal from said means for generating a signal responsive to the first, second, and reverse gear, said gate having an output coupled to said switch, whereby said signal from said gear responsive electrical means controls said control valves only below the threshold speed value.

* * * * *